(12) United States Patent
Hlasny

(10) Patent No.: US 8,380,822 B2
(45) Date of Patent: Feb. 19, 2013

(54) SYSTEMS AND METHODS FOR OBJECT DISTRIBUTION IN A COMMUNICATION SYSTEM

(75) Inventor: Daryl J. Hlasny, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 2753 days.

(21) Appl. No.: 10/315,618

(22) Filed: Dec. 10, 2002

(65) Prior Publication Data

US 2004/0111495 A1 Jun. 10, 2004

(51) Int. Cl.
*G06F 15/177* (2006.01)
*G06F 15/173* (2006.01)
*H04L 1/18* (2006.01)

(52) U.S. Cl. .......................... 709/220; 709/238; 714/749

(58) Field of Classification Search .................. 709/238, 709/239, 240, 242, 243, 220
See application file for complete search history.

(56) References Cited

U.S. PATENT DOCUMENTS

| 5,638,446 A | 6/1997 | Rubin |
| 5,987,502 A * | 11/1999 | Banks et al. .................. 709/203 |
| 6,205,445 B1 | 3/2001 | Tokuyama |
| 6,269,080 B1 | 7/2001 | Kumar |
| 6,289,012 B1 | 9/2001 | Harrington et al. |
| 6,625,773 B1 * | 9/2003 | Boivie et al. .................. 714/749 |
| 6,789,118 B1 * | 9/2004 | Rao .............................. 709/225 |
| 6,856,991 B1 * | 2/2005 | Srivastava ..................... 707/10 |
| 6,990,103 B1 * | 1/2006 | Gollamudi ............... 370/395.31 |
| 7,184,945 B1 * | 2/2007 | Takahashi et al. ............. 703/22 |
| 2002/0161917 A1 * | 10/2002 | Shapiro et al. ................ 709/238 |
| 2002/0165977 A1 * | 11/2002 | Novaes ......................... 709/238 |

FOREIGN PATENT DOCUMENTS

| JP | 2153668 | 6/1990 |
| JP | 5030105 | 2/1993 |
| JP | 11073380 | 3/1999 |
| JP | 2000151708 | 5/2000 |

* cited by examiner

*Primary Examiner* — John Follansbee
*Assistant Examiner* — Alan S Chou
(74) *Attorney, Agent, or Firm* — Austin Rapp & Hardman

(57) ABSTRACT

An electronic device is disclosed. The electronic device includes a processor and memory in electronic communication with the processor. The memory is programmed with instructions for implementing a method. The method may include receiving an object from a server electronic device. The method may also include receiving a transfer queue from the server electronic device. The transfer queue may include a first client electronic device. The method may also include transmitting the object to the first client electronic device.

34 Claims, 18 Drawing Sheets

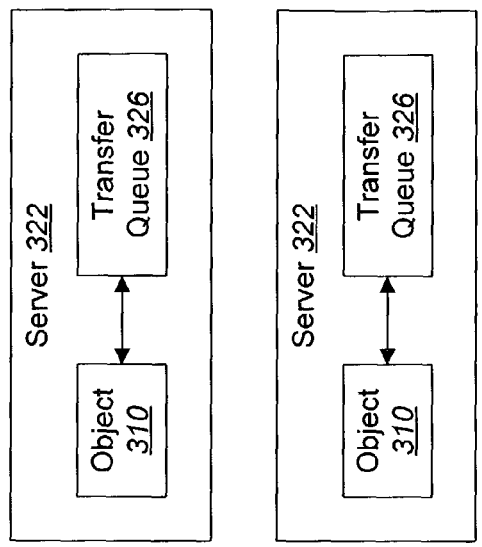
FIG. 3C
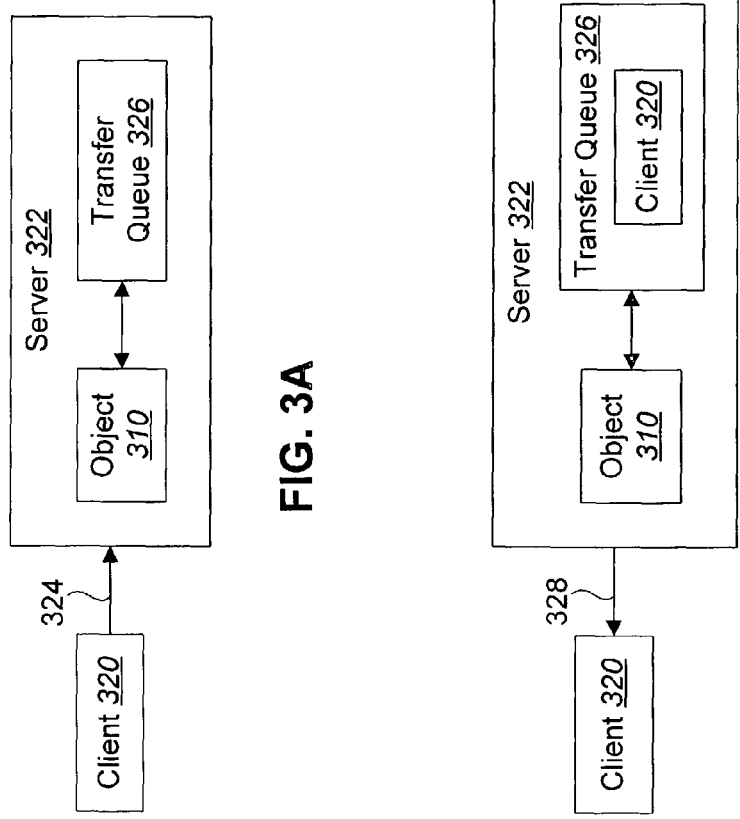
FIG. 3A
FIG. 3B

SYSTEMS AND METHODS FOR OBJECT DISTRIBUTION IN A COMMUNICATION SYSTEM

TECHNICAL FIELD

The present invention relates generally to communication systems. More specifically, the present invention relates to systems and methods for object distribution in a communication system.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Computers typically have one or more processors. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and tells the processors what to do to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

With the increased use of electronic devices and embedded systems, and with the increased demands for the exchange of information, more devices are now able to detect surrounding devices and establish electronic communications with these devices. The Bluetooth specification defines one standard whereby devices can communicate with each other through short-range radio signals. Many kinds of devices may benefit from being able to connect to other devices without needing user intervention. For example, printers, personal digital assistants, digital cameras, telephones, laptop computers, video monitors, electronic calendars, desktops, fax machines, keyboards, joysticks, etc., may all become part of a short-range radio system to connect to other devices. By enabling this type of communication, a bridge is provided to existing data networks to form small private ad hoc groupings of connected devices away from fixed network infrastructures. Thus, device networks may be formed on-the-fly as devices discover each other.

However, in a communication system involving electronic devices, inefficiencies may arise that may slow down or otherwise hinder the overall communication of one or more electronic devices. For example, under some circumstances it may be difficult to transmit an object (e.g., a file, document, image, program, etc.) from one device to many other devices. Thus, benefits may be realized if communications by electronic devices were enhanced with additional systems and methods for providing more effective communication techniques.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIGS. 3A-3C illustrate several possible interactions between a client and a server;

DETAILED DESCRIPTION

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

Figure 1:
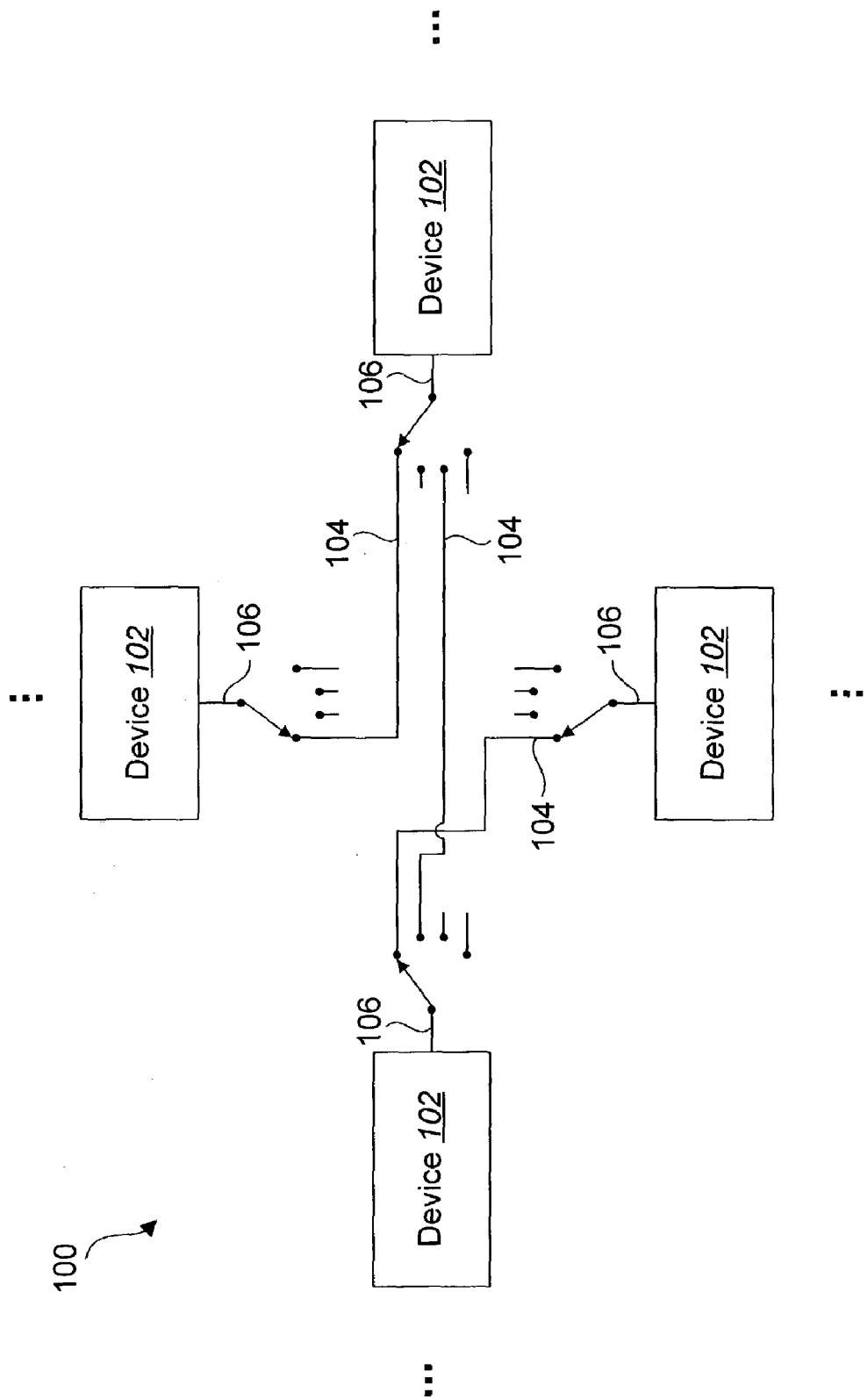
FIG. 1 illustrates a communication system in which some of the embodiments described herein may be practiced.

FIG. 1 illustrates a communication system 100 in which some of the embodiments described herein may be practiced. The system 100 includes a plurality of electronic devices 102. Some examples of electronic devices 102 include a computer, a vending machine, a telephone, a door lock, a temperature sensor, a motor, a switch, a light, a printer, a fax machine, a refrigerator, a health monitor, an elevator/escalator, a copier, a scanner, manufacturing equipment, industrial equipment, computer equipment and peripherals, security systems, monitoring equipment, a thermostat, and the like.

In the embodiment shown in FIG. 1, each device 102 is able to maintain a communication channel 104 with the other devices 102 in the system 100. Each communication channel 104 is separate and does not significantly interfere with other communication channels 104 in the system 100. However, each device 102 only has a single communication interface 106. Thus, each device 102 is only able to communicate with one other device 102 at a time. As shown in FIG. 1, the communication interface 106 of a device 102 can be switched from one communication channel 104 to another communication channel 104. Therefore, a device 102 may communicate with more than one other device 102 in a time multiplexed manner.

Figure 2:
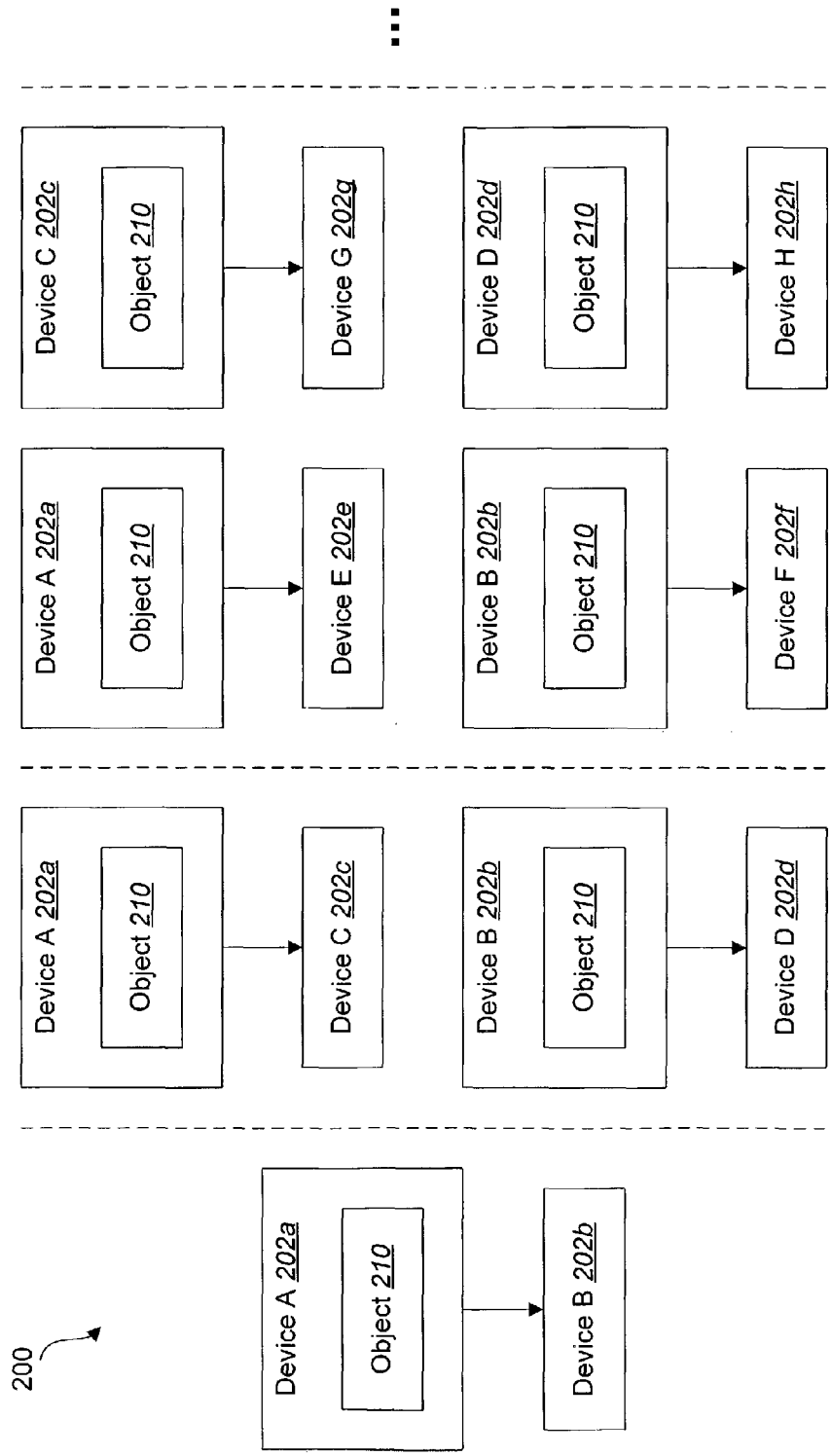
FIG. 2 illustrates an embodiment of a method for distribution of an object in a communication system.

In a communication system 100, it may be desirable to transmit an object (e.g., a file, document, image, program, etc.) from one device 102 to many other devices 102. FIG. 2 illustrates an embodiment of a method 200 for distribution of an object 210 in a communication system 100.

For purposes of clarity in explaining the method 200, a device 202 that transmits an object 210 to another device 202 will be referred to as a "server" of the object 210. A device 202 that receives an object 210 from another device 202 will be referred to as a "client." As shown, each client that receives an object 210 then becomes a server of that object 210.

FIG. 2 illustrates different stages in the method 200 that occur sequentially in time. The different stages are separated in FIG. 2 by dashed lines. In the first stage, an object 210 is initially stored in device A 202a. Thus, device A 202a is a server of the object 210. Device A 202a transmits the object 210 to a client, device B 202b.

In the second stage, device B 202b has received the object 210. Therefore, device B 202b has become a server of the object 210. Device A 202a then transmits the object 210 to another client, device C 202c. Device B 202b also transmits the object 210 to a client, device D 202d.

In the third stage, device C 202c and device D 202d have received the object 210. Therefore, device C 202c and device D 202d have become servers of the object 210. Device A 202a then transmits the object 210 to another client, device E 202e. Device B 202b transmits the object 210 to a client, device F 202f. Device C 202c transmits the object 210 to a client, device G 202g. Device D 202d transmits the object 210 to a client, device H 202h. When device E 202e, device F 202f, device G 202g, and device H 202h receive the object 210, these devices then become servers of the object 210. This process may be repeated until every device 202 in the system 100 has received the object 210.

FIGS. 3A-3C illustrate several possible interactions between a client 320 and a server 322. These interactions may occur while an object 310 is being distributed according to the method 200 shown in FIG. 2. As described previously, a server 322 is a device 102 that transmits an object 310 to another device 102. A client 320 is a device 102 that receives an object 310 from another device 102.

As shown in FIG. 3A, a client 320 may make a request 324 to retrieve an object 310 from a server 322. The requested object 310 may be associated with a transfer queue 326. As will be described in greater detail below, the transfer queue 326 may be used by the server 322 to manage requests for the object 310. The transfer queue 326 may include one or more devices 102 that have made retrieval requests 324 for the object 310 from the server 322. As shown in FIG. 3B, if the server 322 accepts the retrieval request 324 from the client 320, the server 322 may then add the client 320 to the transfer queue 326.

At some point after the client 320 is added to the transfer queue 326, the server 322 may then begin transmission 328 of the object 310 to the client 320. Typically, a server 322 initiates transmission 328 of an object 310 when the server 322 has available communication capacity. Thus, transmission 328 of the object 310 may not occur immediately.

Under some circumstances, a client 320 may reject transmission 328 of the object 310. For example, a client 320 may reject transmission 328 of the object 310 if the object 310 was already transmitted to the client 320 from another server 322. If the client 320 rejects transmission 328 of the object 310, the client 320 may be deleted from the transfer queue 326.

When a server 322 initiates transmission 328 of the object 310 to the client 320, the client 320 may already be receiving a transmission 328 of the object 310 from another server 322. In such a situation, the client 320 may select which server 322 is to complete the transmission 328. The selection may be based on the server 322 that has the fewest number of clients 320 listed in the transfer queue 326.

As shown in FIG. 3C, when transmission 328 of the object 310 is completed, the client 320 is deleted from the transfer queue 326. Typically, the transfer queue 326 is then transmitted to the client 320, and the client 320 becomes a server 322 for the object 310. However, some clients 320 may not be capable of becoming servers 322. The transfer queue 326 is ordinarily not transmitted to such clients 320.

The interactions shown in FIGS. 3A-3C may occur in a variety of contexts. For example, the client 320 may search one or more servers 322 for a specific object 310 or for all objects 310 that satisfy search criteria. A user of the client 320 may then select a particular object 310 located on a particular server 322, and the client 320 may then make a retrieval request 324 for the selected object 310 from the selected server 322. One approach for searching for and retrieving objects 310 is described in co-pending U.S. patent application Ser. No. 09/910,650, entitled "Object Search and Retrieval System for an Ad Hoc Data Communication System," assigned to the assignee of the present invention and hereby incorporated by reference in its entirety.

Sometimes, a desired object 310 may be found on multiple servers 322. In such a situation, the client 320 may rank the servers 322 based on their ability to transmit the object 310. The rankings of the various servers 322 may be based on the communication capacity of the various servers 322 and the estimated transmit rates of the respective communication channels 104. A client 320 may then sequentially make retrieval requests 324 to the various servers 322 in the order of their rankings until a server 322 initiates transmission 328 or until a retrieval request 324 has been made to each server 322.

In some embodiments, after making a retrieval request 324 to a server 322 for an object 310, a client 320 may continue to search for the object 310 on other servers 322. In such a situation, when a server 322 initiates transmission 328 of an object 310 to the client 320, the client 320 may terminate any ongoing searches for the same object 310.

Of course, the embodiments described herein do not necessarily involve searching. In some embodiments, a user of a client 320 may wish to receive a known object 310 located on a known server 322. The user may then provide the client 320 with information about the object 310 and the server 322, thereby allowing the client 320 to make a retrieval request 324.

Figures 4A, 4B:
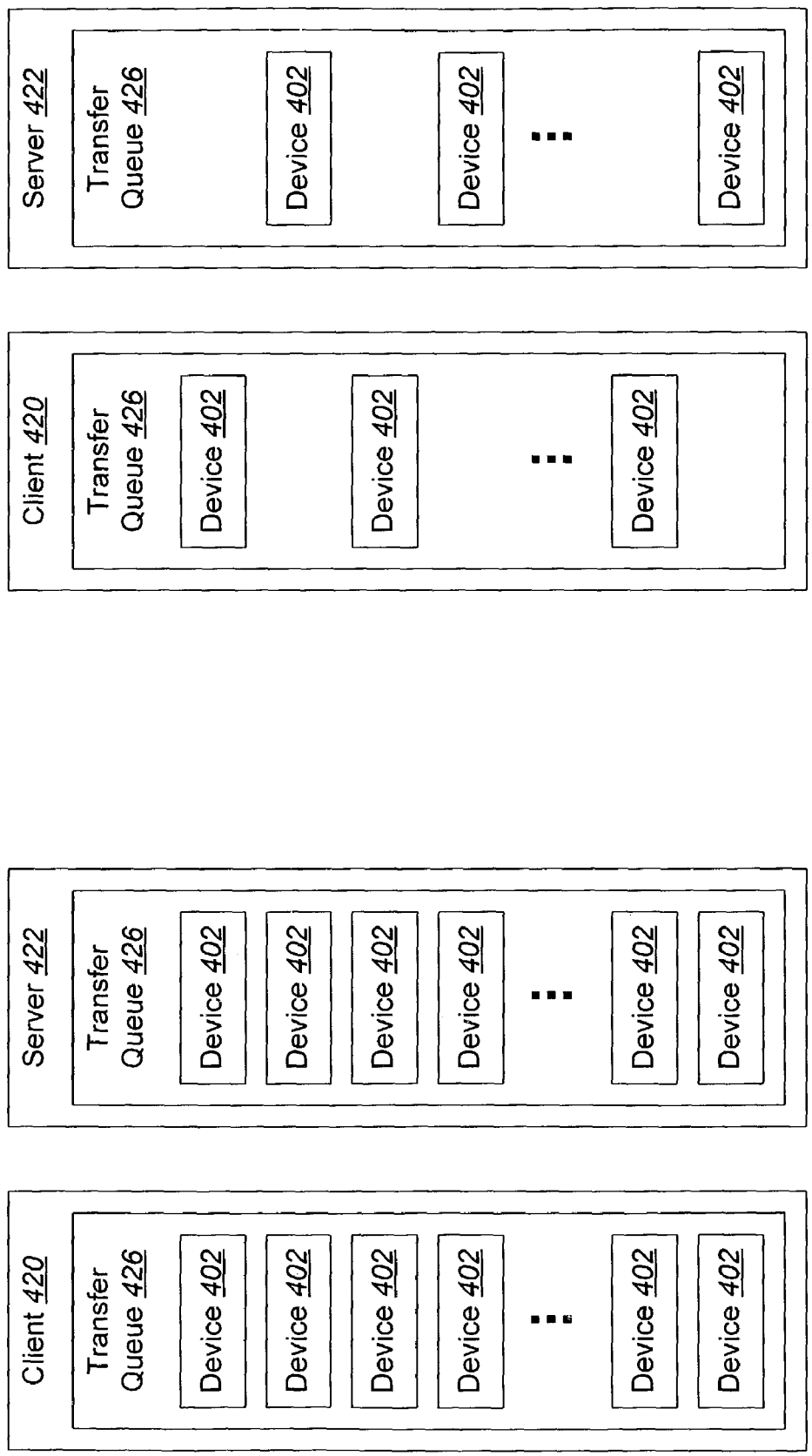
FIGS. 4A-4B illustrate one way in which the devices in the transfer queue may be divided among the client and the server.

As shown in FIG. 4A, when a server 422 transmits a transfer queue 426 to a client 420, the transfer queue 426 may not be empty. In such a situation, the devices 402 in the transfer queue 326 may be divided among the client 420 and the server 422.

FIG. 4B illustrates one way in which the devices 402 in the transfer queue 426 may be divided among the client 420 and the server 422. As shown in FIG. 4B, the division process may occur in such a way that each device 402 is included in the transfer queue 426 stored in the client 420 or the transfer queue 426 stored in the server 422, but not both.

The devices 402 in the transfer queue 426 may be divided among the client 420 and the server 422 in accordance with which device 402 is best able to transmit the object 210 quickly. For example, in one embodiment, the client 420 and the server 422 each estimate the time needed to transmit the object 210 to each device 402 in the transfer queue 426. If the client 420 has the lower estimate with respect to a particular device 402 in the transfer-queue 426, that device 402 will remain in the transfer queue 426 stored in the client 420 and will be deleted from the transfer queue 426 stored in the server 422. Conversely, if the server 422 has the lower estimate with respect to a particular device 402 in the transfer queue 426, that device 402 will remain in the transfer queue 426 stored in the server 422 and will be deleted from the transfer queue 426 stored in the client 420. Devices 402 for which the estimates are about equal may be divided about equally between the client 420 and the server 422. Adjustments may be made to each transfer queue 426 so that the total time required to transmit the object 210 to all devices 402 in each transfer queue 426 is about the same.

Figure 5:
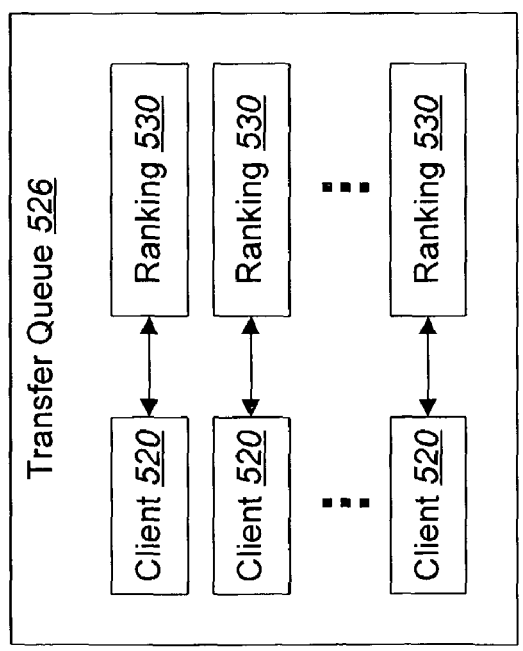
FIG. 5 is a block diagram of an embodiment of a transfer queue.

FIG. 5 is a block diagram of an embodiment of a transfer queue 526. As shown, a transfer queue 526 may include zero or more clients 520 that have made a retrieval request 324 for the object 210 that is associated with the transfer queue 526.

As described previously, a server 322 may be configured to transmit the object 210 associated with the transfer queue 326 to each client 520 in the transfer queue 526. However, the server 322 may only be capable of transmitting the object 210 to one client 520 at a time.

As shown, each client 520 may be associated with a ranking 530. If the server 322 is only capable of transmitting the object 210 to one client 520 at a time, the server 322 typically selects the client 520 with the highest ranking 530 to receive the object 210.

Rankings 530 may be based on a number of criteria. Factors that may be considered in determining the ranking 530 of a client 320 may include whether the client 320 is capable of acting as a server 322 with respect to the object 210, the characteristics of the communication channel 104 between the server 322 and the client 520, whether the client 520 has already been transmitted a portion of the object 210, the estimated amount of time needed to complete transmission 328 of the object 210, the communication capacity of the client 520, and so forth.

Figure 6:
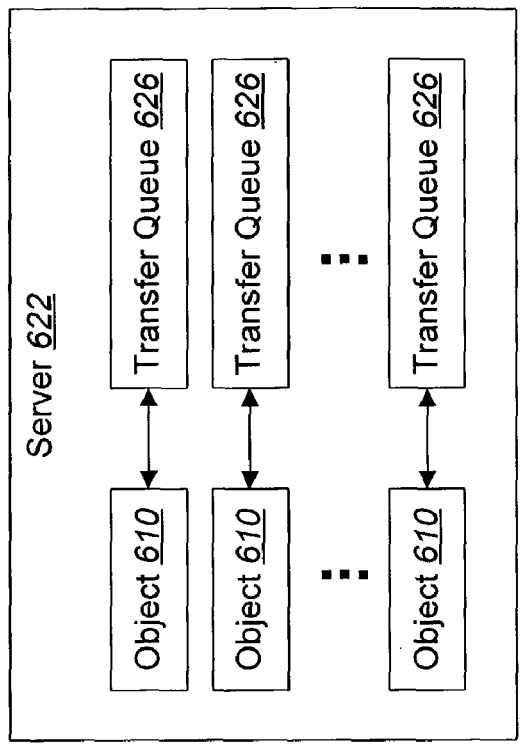
FIG. 6 is a block diagram of an embodiment of a server.

FIG. 6 is a block diagram of an embodiment of a server 622. As shown, a server 622 may include more than one object 610. In such an embodiment, each object 610 may be associated with a transfer queue 626.

Clients 320 may make retrieval requests 324 for any of the objects 610 stored on the server 622. If the server 622 is only capable of transmitting one object 610 at a time, the object associated with the most retrieval requests 324 may be given priority.

FIGS. 7A through 7M illustrate an embodiment of a method for distribution of an object 710 in a system 100 like the one shown in FIG. 1. The method involves eight devices 702, which will be referred to as device A 702a through device H 702h.

In general, each device 702 in the system 100 is capable of functioning as a server 322 and a client 320 with respect to the object 710 that is to be distributed. However, device B 702b is only capable of functioning as a client 320.

In general, the communication speed between the different devices 702 in the system 100 is about the same. However, the following exceptions apply. The communication speed between device A 702a and device G 702g is faster than the communication speed between device D 702d and device G 702g. Also, the communication speed between device C 702c and any other device 702 in the system 100 is slower than the communication speed between other devices 702 in the system 100.

Figure 7B:
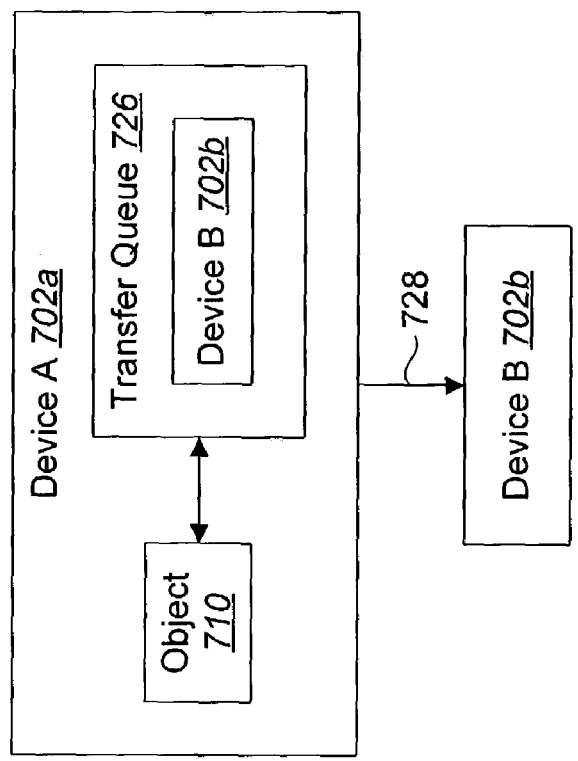
FIGS. 7A through 7M illustrate an embodiment of a method for distribution of an object in a communication system.
Figure 7A:
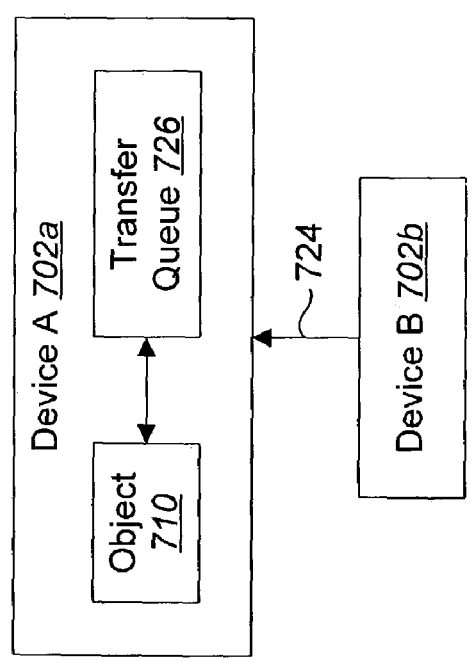
Figure 7D:
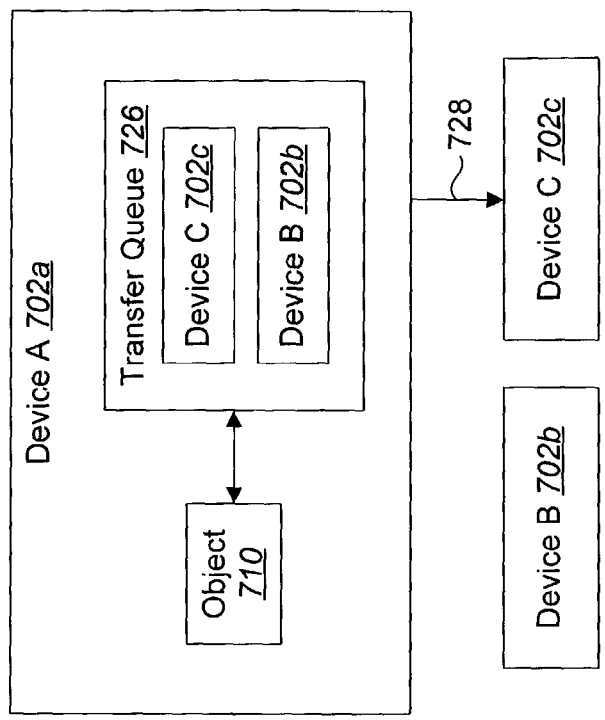

As shown in FIG. 7A, an object 710 becomes available on device A 702a. Device A 702a then becomes a server 322 for the object 710. A transfer queue 726 is then created for the object 710 and stored in device A 702a. Device B 702b then makes a request 724 to retrieve the object 710 from device A 202a.

Device A 702a accepts the retrieval request 724 from device B 702b, and device B 702b is added to the transfer queue 726 for the object 710. As shown in FIG. 7B, Device A 702a then initiates transmission 728 of the object 710 to device B 702b because device B 702b is the only device 702 in the transfer queue 726.

Figure 7C:
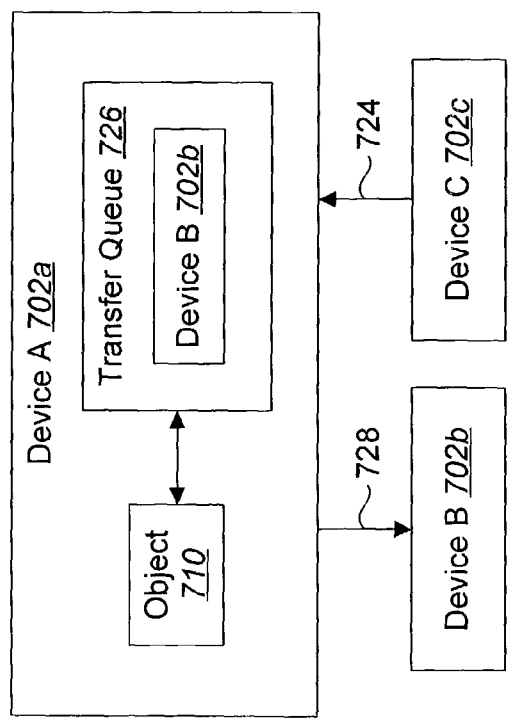

As shown in FIG. 7C, device C 702c makes a request 724 to retrieve the object 710 from device A 702a. This occurs while device A 702a continues transmission 728 of the object 710 to device B 702b.

Figure 7E:
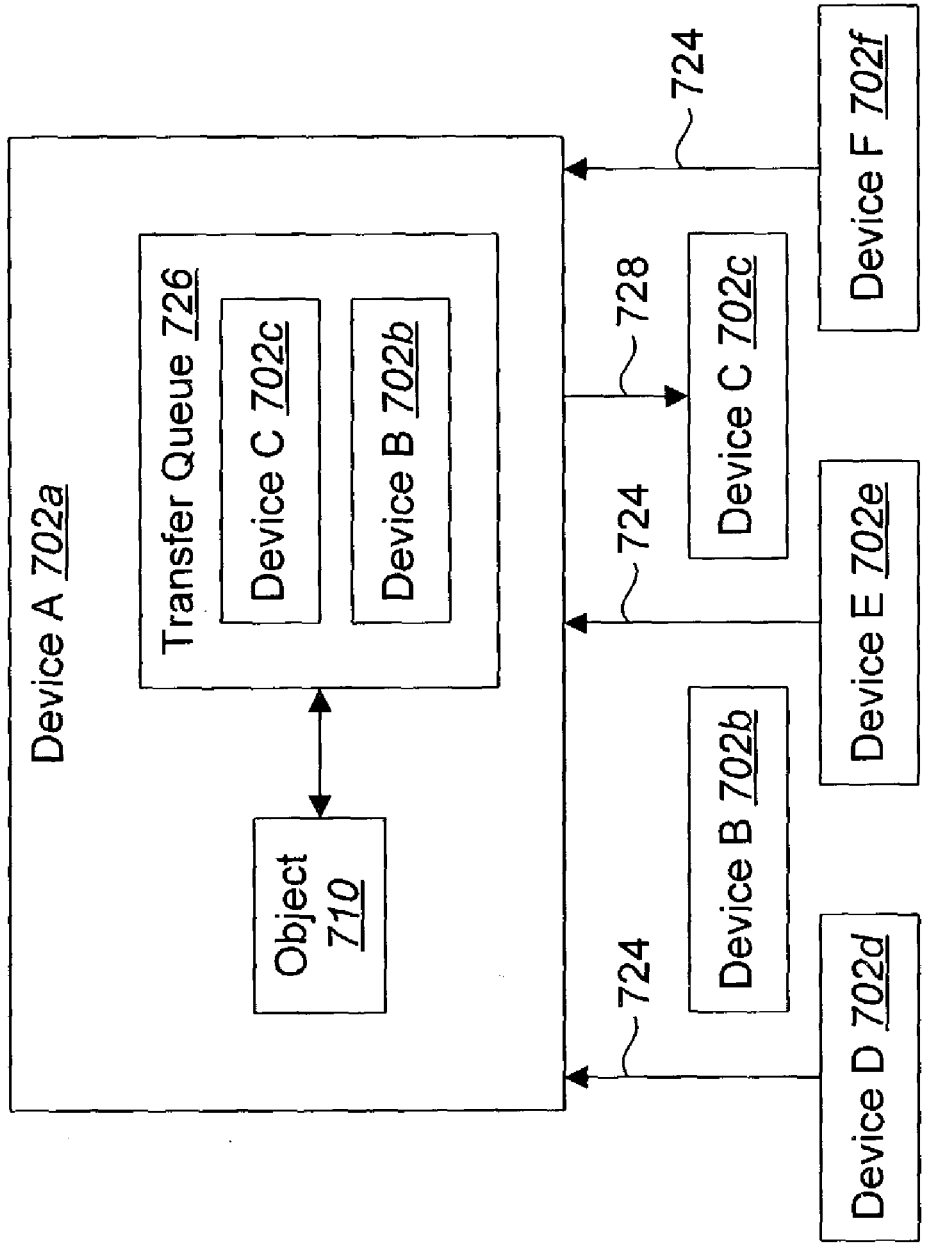

Device A 702a accepts the retrieval request 724 from device C 702c. As shown in FIG. 7E, device C 702c is added to the transfer queue 726. Device C 702c is ranked ahead of device B 702b in the transfer queue 726 because device C 702c is capable of functioning as a server 322, whereas device B 702b is only capable of functioning as a client 320. Because device C 702c is now ranked first in the transfer queue 726, device A 702a suspends transmission 728 of the object 710 to device B 702b and initiates transmission 728 of the object 710 to device C 702c.

As shown in FIG. 7E, device D 702d, device E 702e, and device F 702f each make a request 724 to retrieve the object 710 from device A 702a. This occurs while device A 702a continues transmission 728 of the object 710 to device C 702c. Device D 702d makes its retrieval request 724 before device E 702e makes its retrieval request 724, and device E 702e makes its retrieval request 724 before device F 702f makes its retrieval request 724.

Figure 7F:
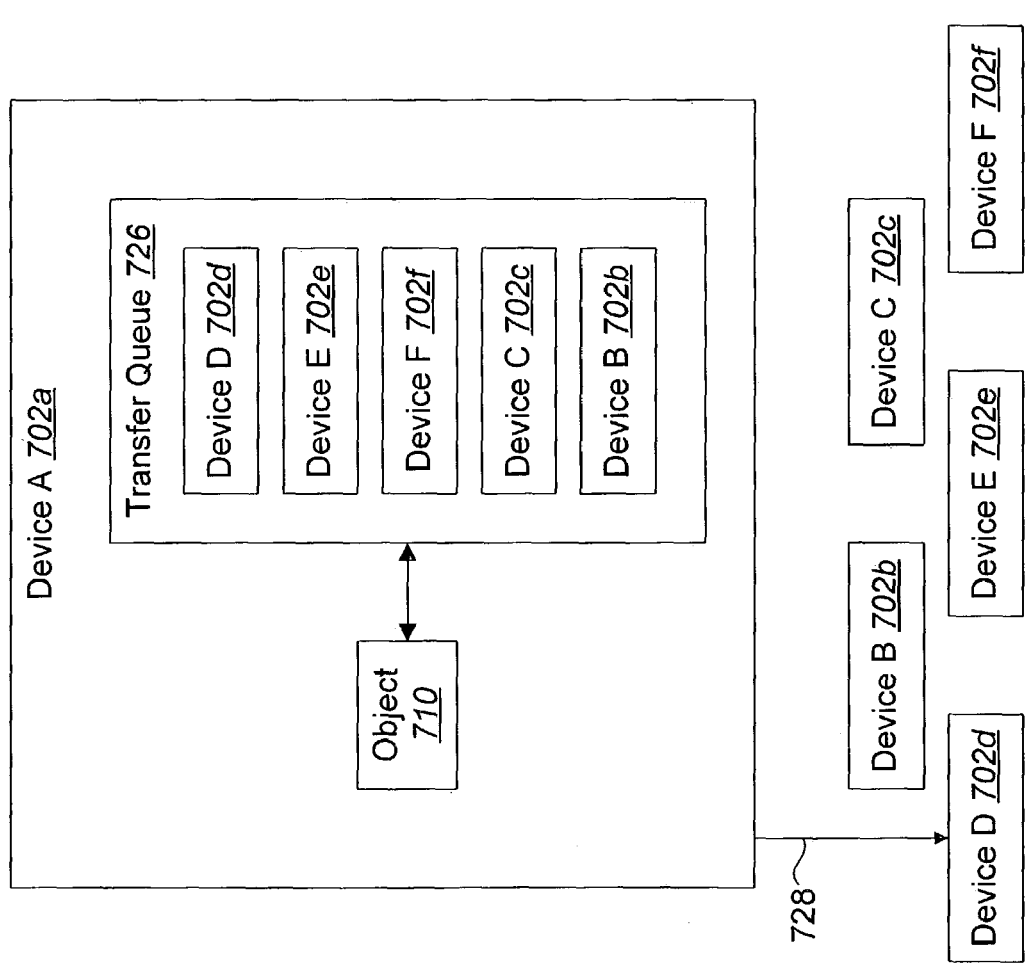

Device A 702a accepts the retrieval requests 724 from device D 702d, device E 702e, and device F 702f. Device D 702d, device E 702e, and device F 702f are then added to the transfer queue 726, as shown in FIG. 7F. Device D 702d, device E 702e, and device F 702f are each ranked ahead of device C 702c in the transfer queue 726 because the communication speed between these devices 702 and device A 702a is faster than the communication speed between device C 702c and device A 702a. Device D 702d is ranked ahead of device E 702e and device F 702f in the transfer queue 726 because device D 702d made its retrieval request 724 before device E 702e and device F 702f made their retrieval requests 724. Similarly, device E 702e is ranked ahead of device F 702f in the transfer queue 726 because device E 702e made its retrieval request 724 before device F 702f made its retrieval request 724. Because device D 702d is now ranked first in the transfer queue 726, device A 702a suspends transmission 728 of the object 710 to device C 702c and initiates transmission 728 of the object 710 to device D 702d.

Figure 7G:
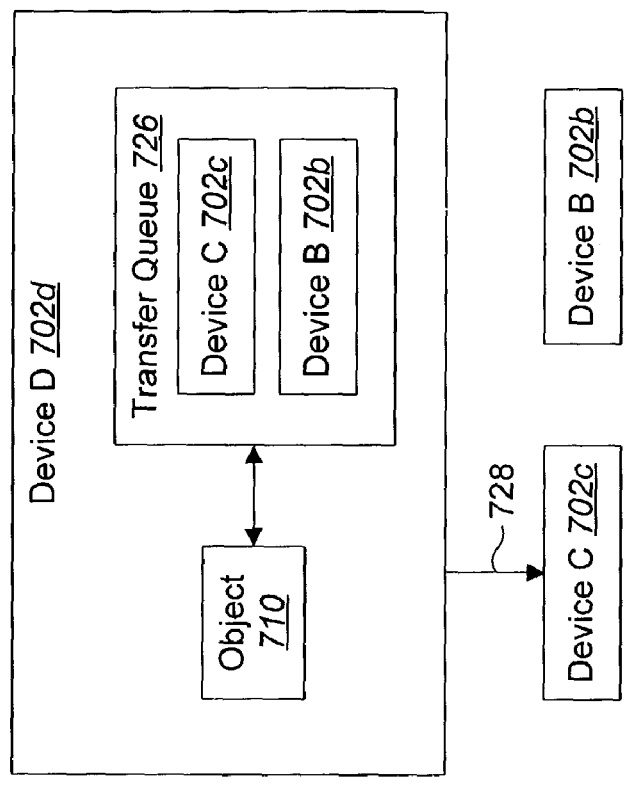
Figure 7G:
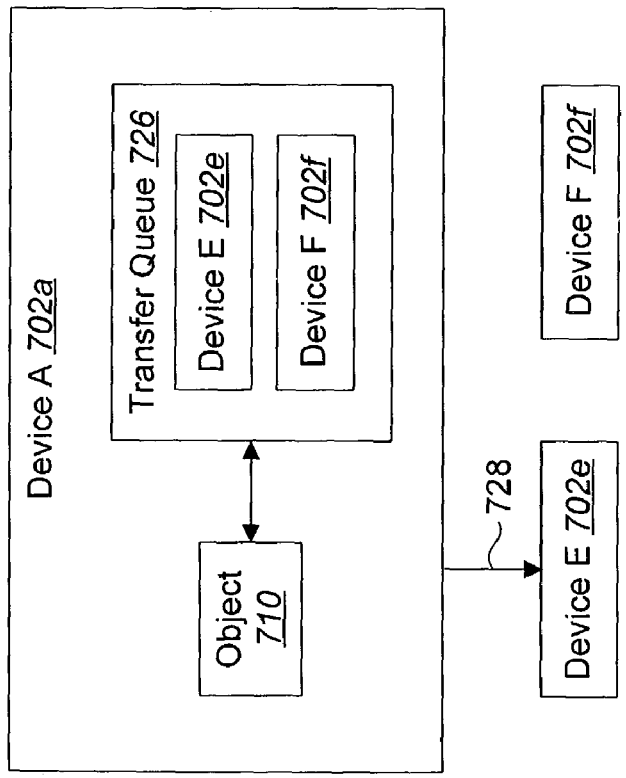

Device A 702a completes transmission 728 of the object 710 to device D 702d. The transfer queue 726 for the object 710 is also transmitted from device A 702a to device D 702d. Device D 702d then becomes a server 322 for the object 710. Device A 702a and device D 702d then communicate with each other about dividing the devices 702 in the transfer queues 726. Because device A 702a and device D 702d are equally capable of transmitting data to each device 702 in the transfer queue 726, the devices 702 in the transfer queues 726 are divided about equally between device A 702a and device D 702d. Thus, device C 702c and device B 702b are deleted from the transfer queue 726 stored in device A 702a, but remain in the transfer queue 726 stored in device D 702d. Similarly, device E 702e and device F 702f are deleted from the transfer queue 726 stored in device D 702d, but remain in the transfer queue 726 stored in device A 702a. FIG. 7G shows device A 702a and device D 702d after this process is complete. Because device E 702e is ranked first in the transfer queue 726 stored in device A 702a, device A 702a initiates transmission 728 of the object 710 to device E 702e. Because device C 702c is ranked first in the transfer queue 726 stored in device D 702d, device D 702d continues the transmission 728 of the object 710 to device C 702c that was partially completed by device A 702a.

Figure 7H:
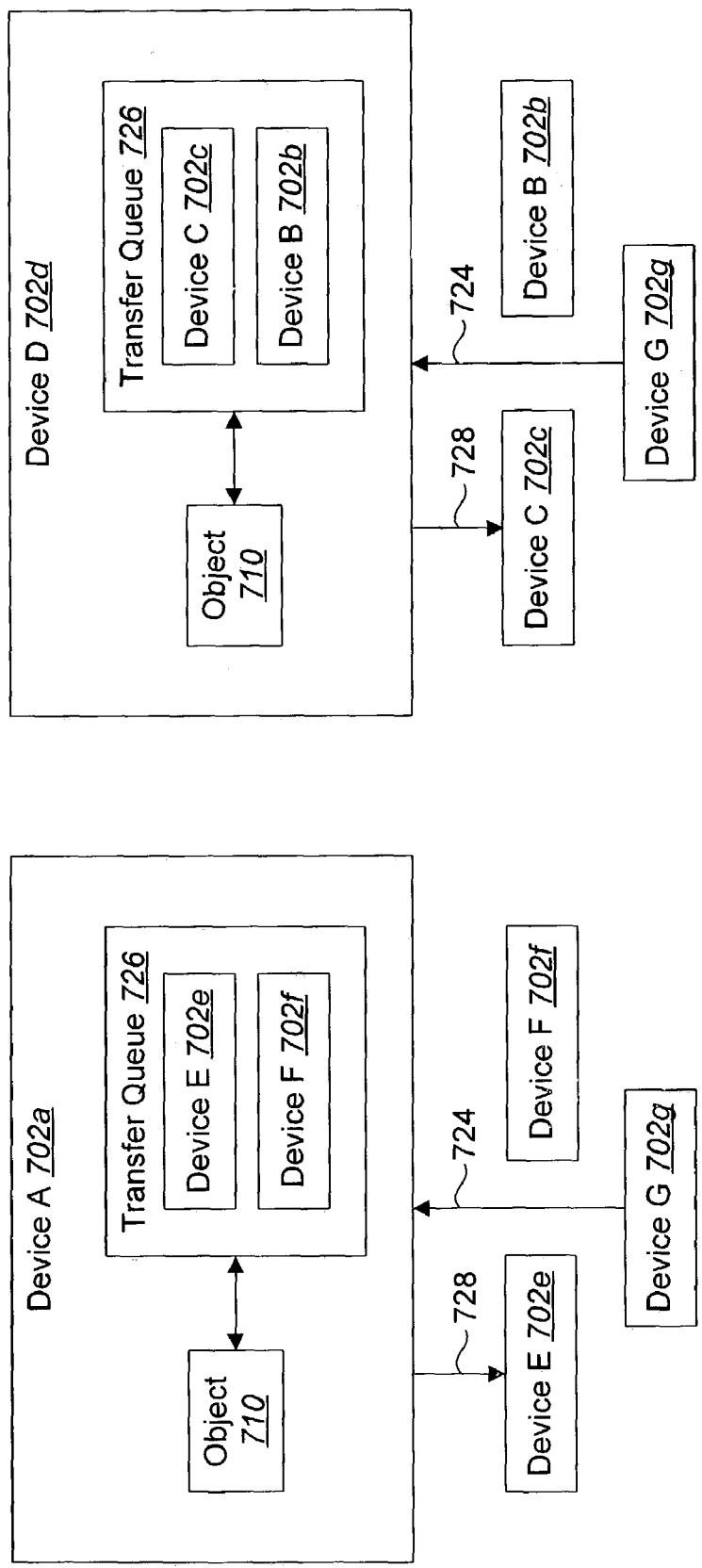

Device G 702g then finds the object 710 in device A 702a and device D 702d. Device G 702g ranks device A 702a and device D 702d based on communication capacity and communication speed. Because both device A 702a and device D 702d are currently transmitting the object 710 to other devices 702, capacity has no effect on the ranking. The communication speed between device A 702a and device G 702g is faster than the communication speed between device D 702d and device G 702g, so device A 702a is ranked higher than device D 702d. Thus, device G 702g first makes a retrieval request 724 to device A 702a. This occurs while device A 702a continues to transmit the object 710 to device E 702e. Device G 702g then makes a retrieval request to device D 702d. This occurs while device D 702d continues to transmit the object 710 to device C 702c. FIG. 7H shows device G 702g making a retrieval request 724 to both device A 702a and device D 702d.

Figure 7I:
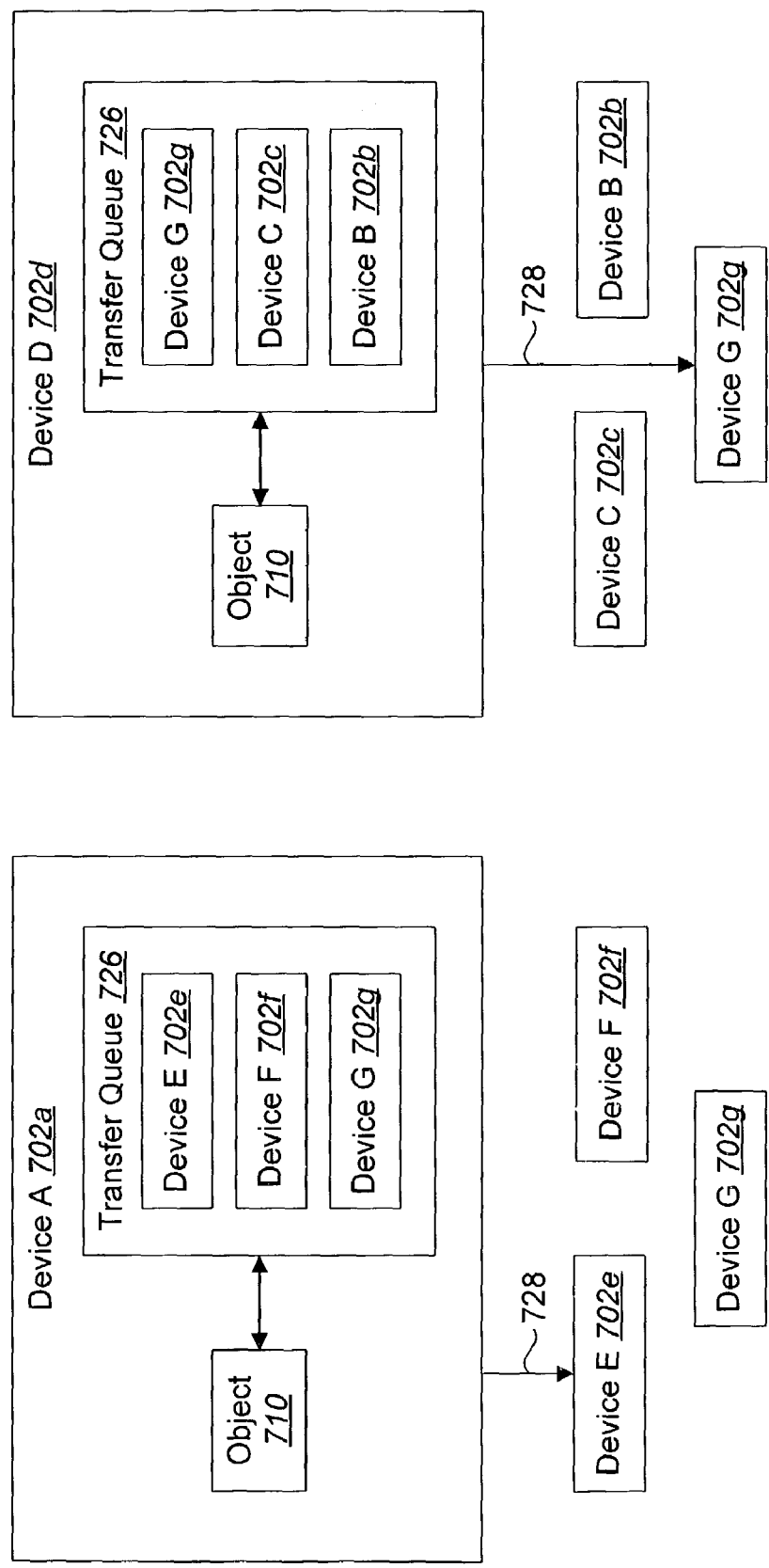

Device A 702a accepts the retrieval request from device G 702g, and device G 702g is added to the transfer queue 726 stored in device A 702a. Device G 702g is ranked after device E 702e and device F 702f in the transfer queue 726 stored in device A 702a because device E 702e and device F 702f made their retrieval requests 724 before device G 702g made its retrieval request 724. Device D 702d also accepts the retrieval request 724 from device G 702g, and device G 702g is added to the transfer queue 726 stored in device D 702d. Device G 702g is ranked first in the transfer queue 726 stored in device D 702d. Device G 702g is ranked ahead of device C 702c because the communication speed between device D 702d and device G 702g is faster than the communication speed between device D 702d and device C 702c. Device G 702g is ranked ahead of device C 702c because device G 702g is capable of functioning as a server 322, whereas device B 702b is only capable of functioning as a client 320. Because device G 702g is ranked first in the transfer queue 726 stored in device D 702d, device D 702d suspends transmission 728 of the object 710 to device C 702c and initiates transmission 728 of the object 710 to device G 702g, as shown in FIG. 7I.

Figure 7J:
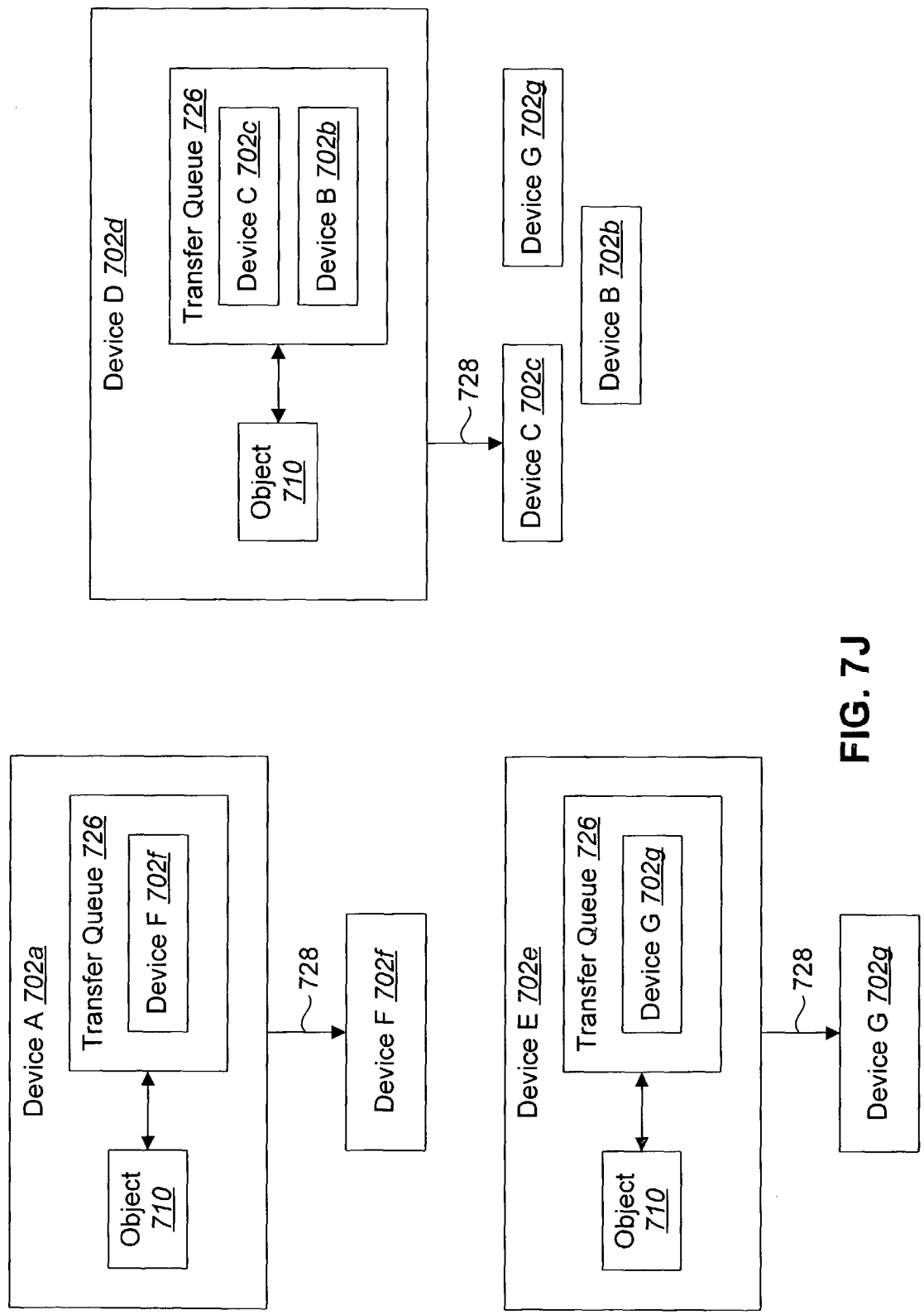

When device A 702a completes transmission 728 of the object 710 to device E 702e, the transfer queue 726 stored in device A 702a is also transmitted to device E 702e. Device E 702e then becomes a server 322 for the object 710. Device A 702a and device E 702e then divide the devices 702 in the transfer queue 726. Because device A 702a and device E 702e are equally capable of transmitting data to each device 702 in the transfer queue 726, the devices 702 in the transfer queue 726 are divided about equally between device A 702a and device E 702e. Thus, device G 702g is deleted from the transfer queue 726 stored in device A 702a, but remains in the transfer queue 726 stored in device E 702e. Similarly, device F 702f is deleted from the transfer queue 726 stored in device E 702e, but remains in the transfer queue 726 stored in device A 702a. FIG. 7J shows device A 702a and device E 702e after this process is complete. Because device F 702f is now the only device 702 in the transfer queue 726 stored in device A 702a, device A 702a initiates transmission 728 of the object 710 to device F 702f. Because device G 702g is the only device 702 in the transfer queue 726 stored in device E 702e, device E 702e initiates transmission 728 of the object 710 to device G 702g. This causes device D 702d to suspend transmission 728 of the object 710 to device G 702g and to delete device G 702g from the transfer queue 726 stored in device D 702d. Because device C 702c is now ranked first in the transfer queue 726 stored in device D 702d, device D 702d continues transmission 728 of the object 710 to device C 702c. As described previously, device C 702c previously received a portion of the object 710 from device A 702a and another portion of the object 710 from device D 702d. Device D 702d can simply continue the transmission 728 at the point at which it was previously suspended.

Figure 7K:
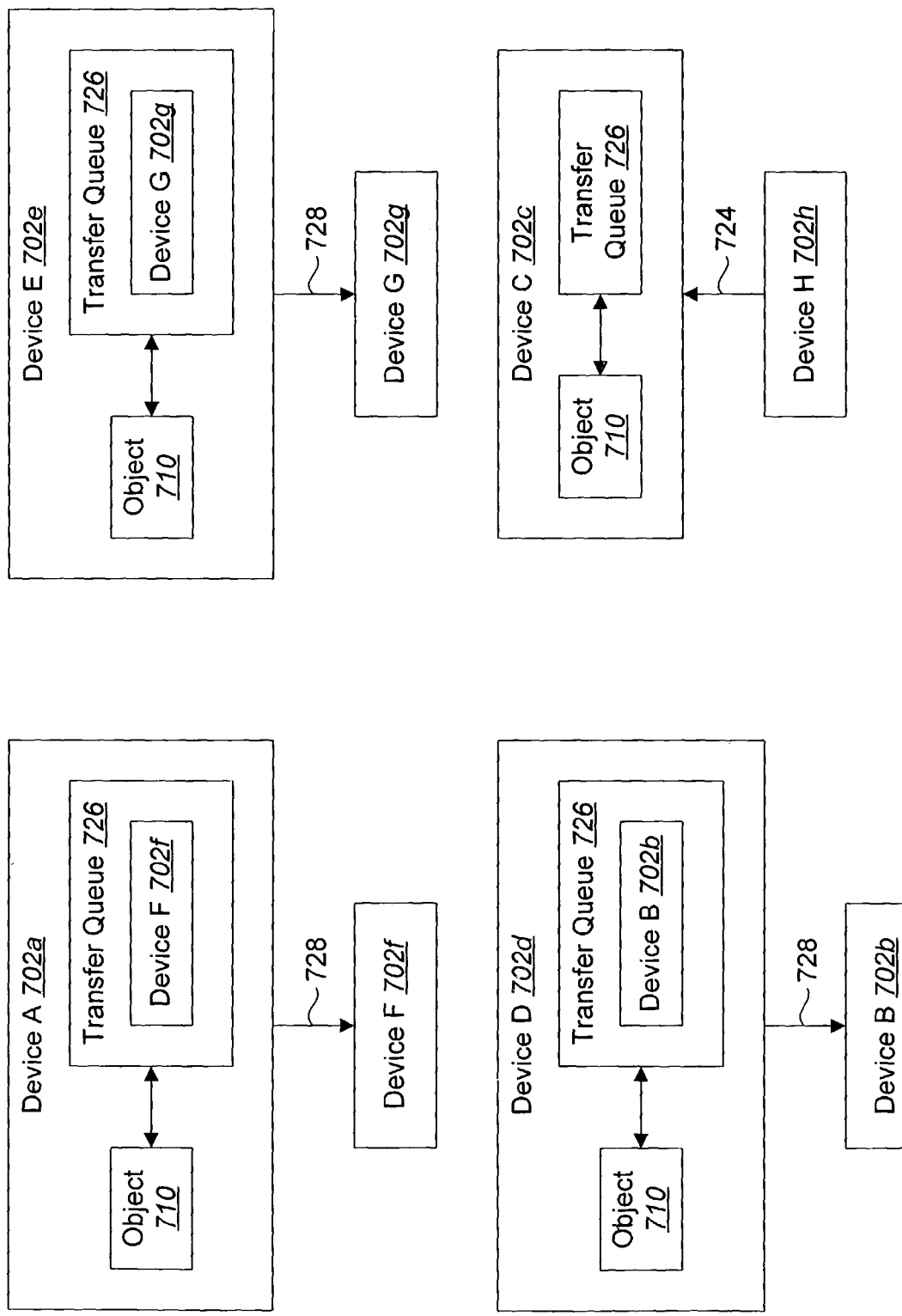

When device D 702d completes transmission 728 of the object 710 to device C 702c, the transfer queue 726 stored in device D 702d is also transmitted to device C 702c. Device C 702c then becomes a server 322 for the object 710. Device D 702d and device C 702c then communicate with each other about dividing the devices 702 in the transfer queue 726. Because device D 702d and device C 702c are equally capable of transmitting data to device B 702b (the only device 702 in the transfer queue 726), device D 702d is arbitrarily selected. Device B 702b is therefore deleted from the transfer queue 726 stored in device C 702c, but remains in the transfer queue 726 stored in device D 702d. The transfer queue 726 stored in device C 702c is now empty. FIG. 7K shows device C 702c and device D 702d after this process is complete.

Device H 702h then finds the object 710 in device A 702a, device E 702e, device D 702d, and device C 702c. Because device C 702c is capable of immediately initiating transmission 728 of the object 710 to device H 702h, device H 702h makes a retrieval request 724 to device C 702c. FIG. 7K shows device H 702h making the retrieval request 724 to device C 702c.

Figure 7L:
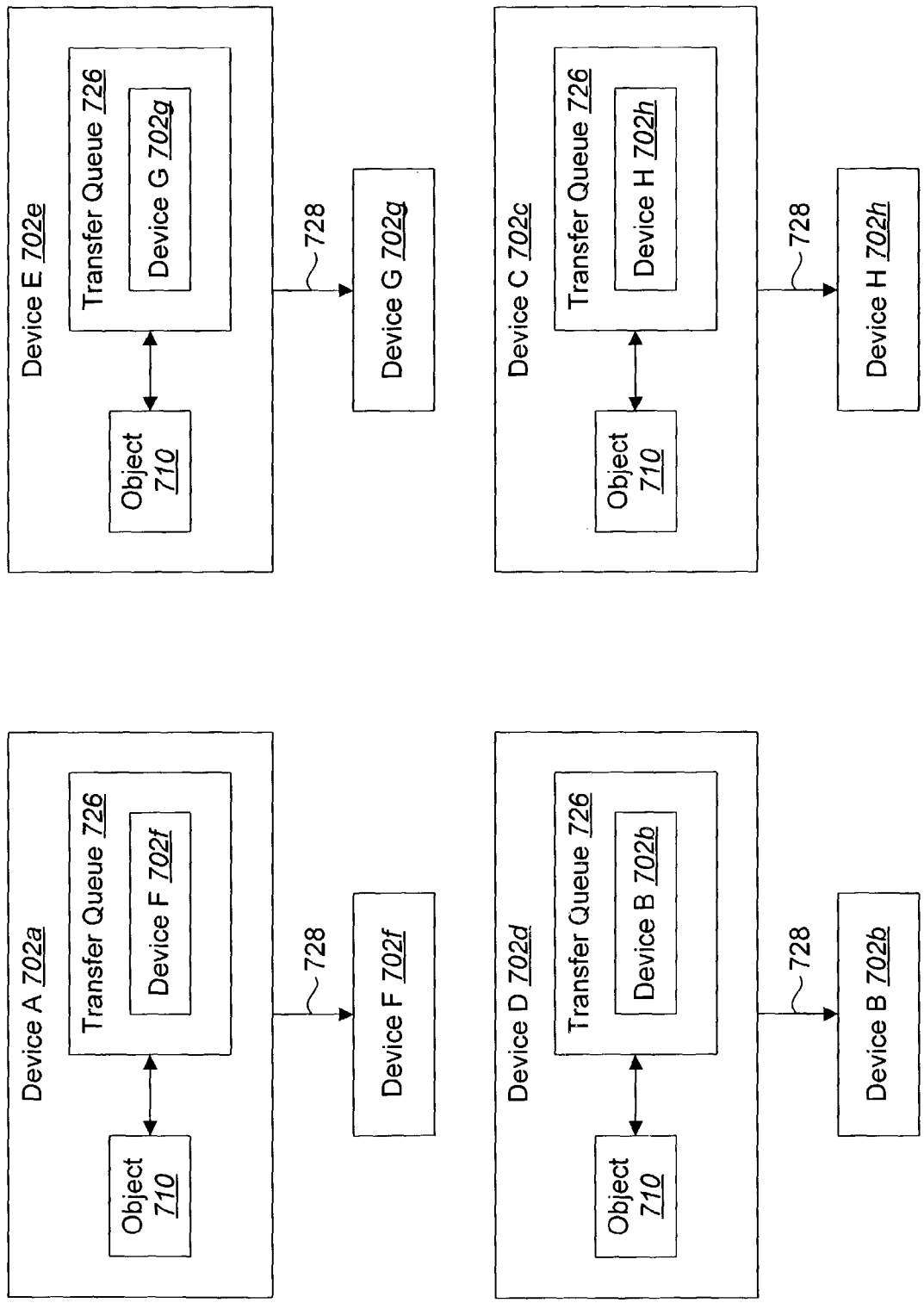

Device C 702c accepts the retrieval request 724 from device H 702h, and device H 702h is added to the transfer queue 726 stored in device C 702c. Device C 702c then initiates transmission 728 of the object 710 to device H 702h because device H 702h is the only device 702 in the transfer queue 726 stored in device C 702c. FIG. 7L shows device C 702c initiating transmission 728 of the object 710 to device H 702h.

Figure 7M:
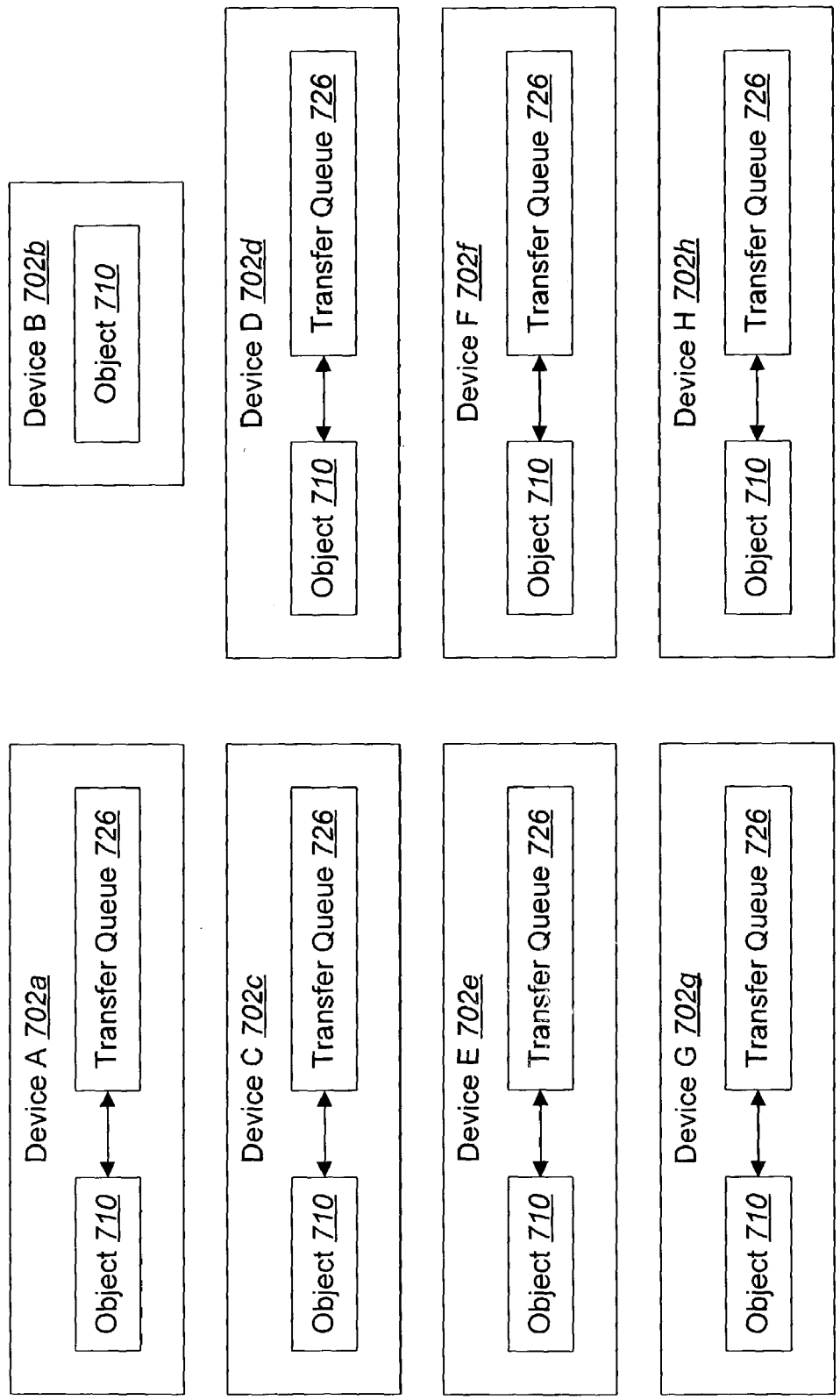

As shown in FIG. 7M, device A 702a completes transmission 728 of the object 710 to device F 702f, device E 702e completes transmission 728 of the object 710 to device G 702g, device D 702d completes transmission 728 of the object 710 to device B 702b (this transmission 728 was partially completed by device A 702a, as described above), and device C 702c completes transmission 728 of the object 710 to device H 702h. This empties the transfer queues 726 stored in device A 702a, device G 702g, device D 702d, and device C 702c. The empty transfer queue 726 stored in device A 702a is transmitted from device A 702a to device F 702f, the empty transfer queue 726 stored in device E 702e is transmitted from device E 702e to device G 702g, and the empty transfer queue 726 stored in device C 702c is transmitted from device C 702c to device H 702h. Device F 702f, device G 702g, and device H 702h then become servers 322 for the object 710. However, at this point each device 702 in the system 100 has received the object 710, so no further transmissions 728 are made.

Figure 8:
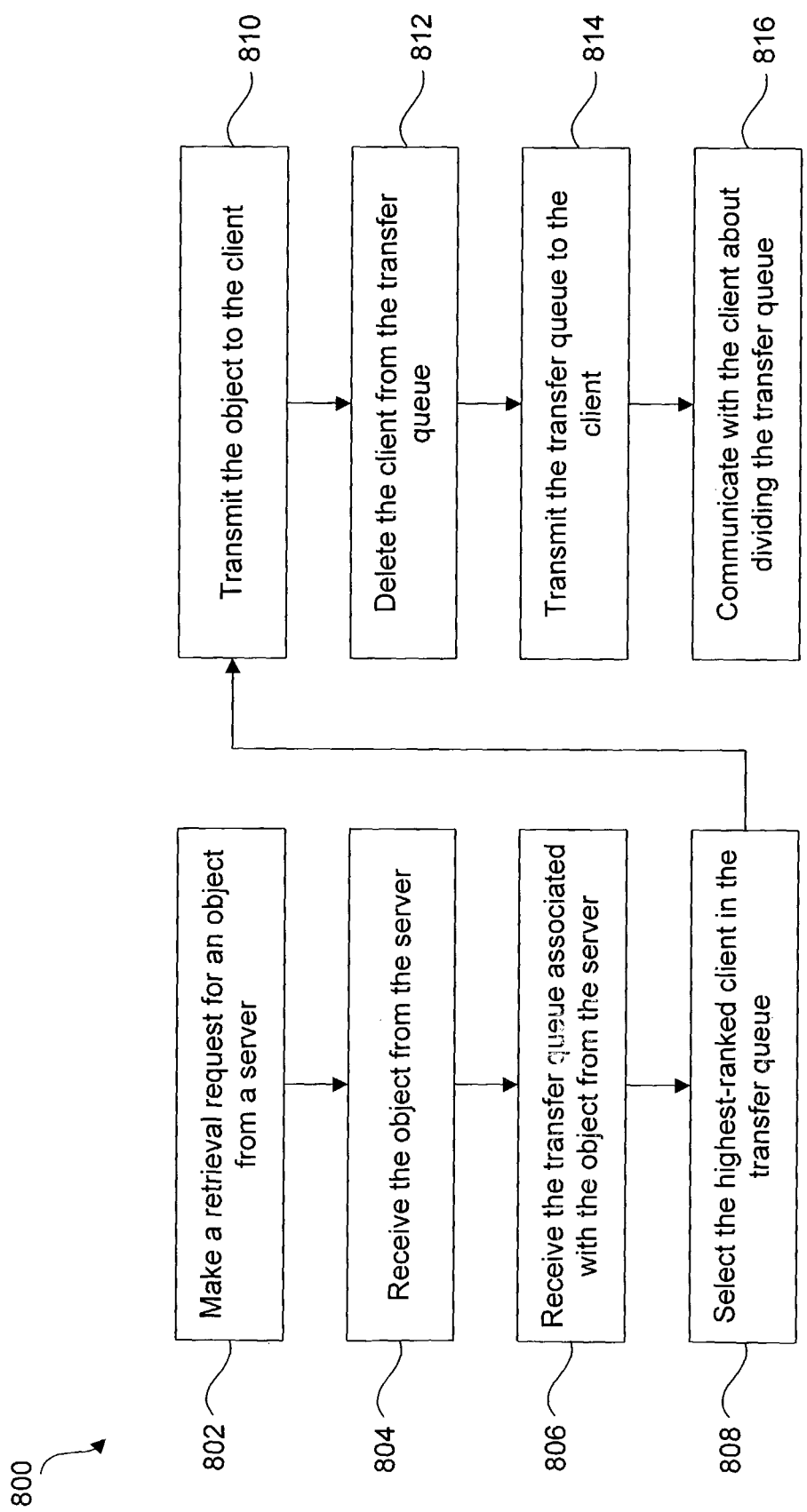
FIG. 8 is a flow diagram illustrating an embodiment of a method for distribution of an object in a communication system.

FIG. 8 is a flow diagram illustrating an embodiment of a method 800 for distribution of an object 210 in a communication system 100. The method 800 begins by making 802 a retrieval request 324 for an object 210 from a server 322. The object 210 may then be received 804 from the server 322. The transfer queue 326 may then be received 806 from the server 322.

The method 800 may then involve selecting 808 the highest ranked client 320 in the transfer queue 326, and then transmitting 810 the object 210 to the client 320 selected in step 808. The client 320 may then be deleted 812 from the transfer queue 326. The transfer queue 326 may then be transmitted 814 to the client 320. The method 800 may then involve communicating 816 with the client 320 about dividing the transfer queue 326.

Figure 9:
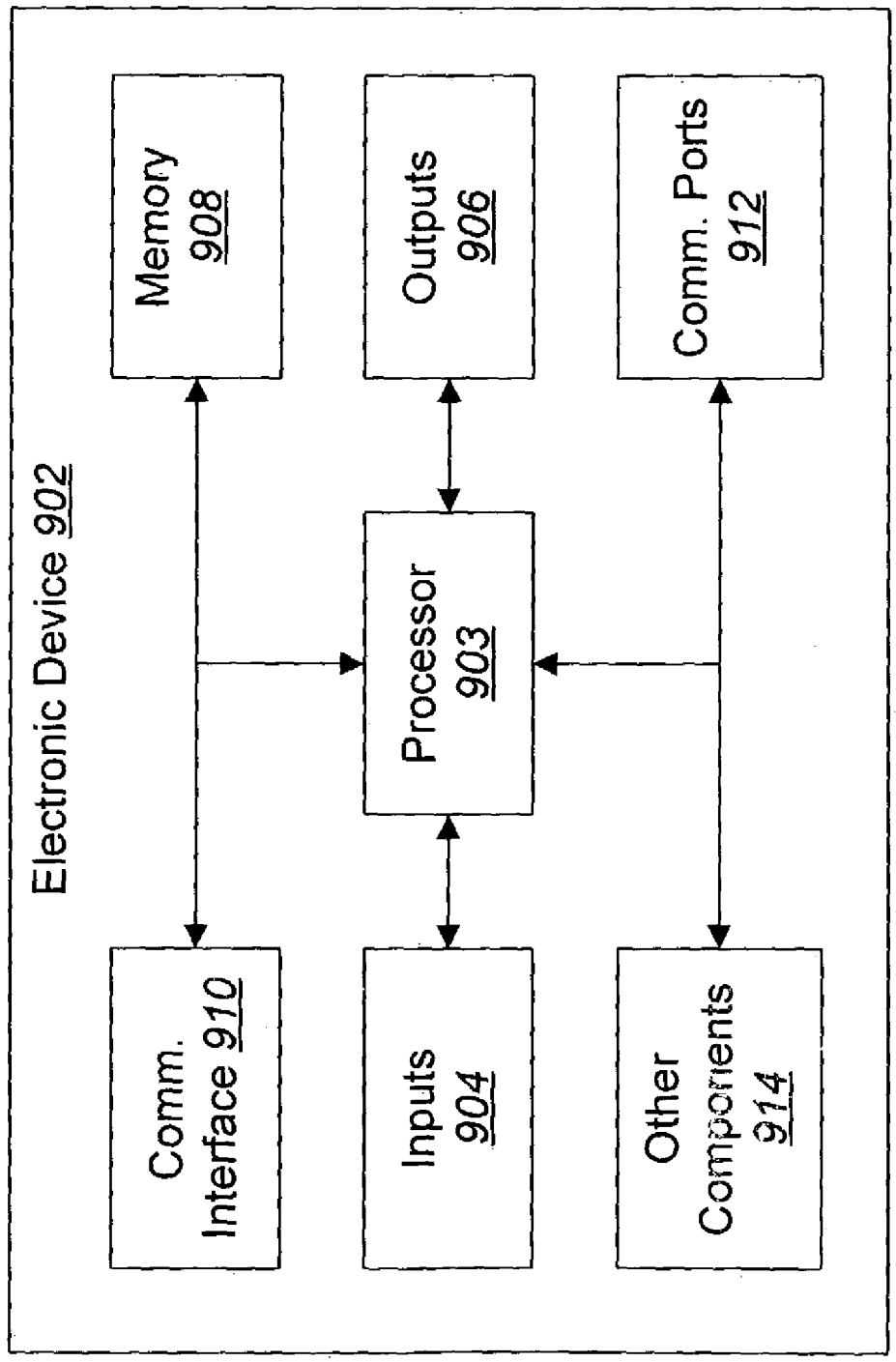
FIG. 9 is block diagram illustrating the major hardware components typically utilized in an electronic device.

FIG. 9 is block diagram illustrating the major hardware components typically utilized in an electronic device 902. An electronic device 902 typically includes a processor 903 in electronic communication with input components or devices 904 and/or output components or devices 906. The processor 903 is operably connected to input 904 and/or output devices 906 capable of electronic communication with the processor 903, or, in other words, to devices capable of input and/or output in the form of an electrical signal. Embodiments of devices 902 may include the inputs 904, outputs 906 and the processor 903 within the same physical structure or in separate housings or structures.

The electronic device 902 may also include memory 908. The memory 908 may be a separate component from the processor 903, or it may be on-board memory 908 included in the same part as the processor 903. For example, microcontrollers often include a certain amount of on-board memory.

The processor 903 is also in electronic communication with a communication interface 910. The communication interface 910 may be used for communications with other devices 902. Thus, the communication interfaces 910 of the various devices 902 may be designed to communicate with each other to send signals or messages between the electronic devices 902.

The electronic device 902 may also include other communication ports 912. In addition, other components 914 may also be included in the electronic device 902.

Of course, those skilled in the art will appreciate the many kinds of different devices that may be used with embodiments herein. Accordingly, the block diagram of FIG. 9 is only meant to illustrate typical components of an electronic device 902 and is not meant to limit the scope of embodiments disclosed herein.

One exemplary application of the embodiments described herein may be with the Bluetooth standard and the relevant personal area network technology relating to Bluetooth. The Bluetooth standard is described in the Specification of the Bluetooth System, incorporated herein by reference. Of course, it will be appreciated by those skilled in the art that the embodiments and inventive principles disclosed herein are not limited to personal area network technology and/or to Bluetooth networks. The inventive principles herein may be applied to various types of communications systems that include electronic devices 102 that communicate with each other.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In an electronic device, a method comprising:
receiving an object from a server electronic device;
receiving a transfer queue that is associated with the object from the server electronic device, the transfer queue comprising a plurality of electronic devices that have requested the object but have not received the object;
after the object and the transfer queue are received from the server electronic device, communicating with the server electronic device about dividing the plurality of client electronic devices among the transfer queue and a server transfer queue stored in the server electronic device for further distribution of the object, wherein the dividing of the plurality of client electronic devices among the transfer queue and the server transfer queue is effected without involvement of another device that is separate from the electronic device and the server electronic device; and
transmitting the object to a first client electronic device of the plurality of electronic devices, wherein the first client electronic device is included in the transfer queue after the plurality of client electronic devices are divided among the transfer queue and the server transfer queue, and wherein the server electronic device begins transmitting the object to at least one client electronic device that is included in the server transfer queue after the plurality of client electronic devices are divided among the transfer queue and the server transfer queue.

2. The method of claim 1, wherein each client electronic device of the plurality of client electronic devices is associated with a ranking, and wherein the first client electronic device is associated with the highest ranking.

3. The method of claim 2, wherein the ranking is based on the estimated amount of time needed to complete transmission of the object.

4. The method of claim 1, wherein the plurality of client electronic devices are divided among the transfer queue and the server transfer queue in accordance with whether the electronic device or the server electronic device is able to transmit the object most effectively.

5. The method of claim 1, further comprising transmitting the transfer queue to the first client electronic device.

6. The method of claim 5, further comprising deleting the first client electronic device from the transfer queue after the object is transmitted to the first client electronic device and before the transfer queue is transmitted to the first client electronic device.

7. The method of claim 1, further comprising:
searching the server electronic device for the object;
finding the object on the server electronic device; and
making a retrieval request for the object to the server electronic device.

8. The method of claim 7, wherein the second client electronic device is ranked ahead of the first client electronic device in the transfer queue, and further comprising:
suspending transmission of the object to the first client electronic device; and
resuming transmission of the object to the first client electronic device after the object has been transmitted to the second client electronic device.

9. The method of claim 1, further comprising:
receiving a retrieval request for the object from a second client electronic device;

adding the second client electronic device to the transfer queue; and transmitting the object to the second client electronic device.

10. The method of claim 1, wherein transmitting the object to the first client electronic device comprises completing transmission of the object to the first client electronic device.

11. The method of claim 1, wherein the electronic device comprises a single communication interface.

12. In an electronic device comprising an object, a method comprising:

associating the object with a transfer queue;

receiving retrieval requests for the object from a plurality of client electronic devices;

adding the plurality of client electronic devices to the transfer queue;

transmitting the object and the transfer queue to a first client electronic device of the plurality of client electronic devices; and after the object is transmitted to the first client electronic device, communicating with the first client electronic device about dividing the plurality of client electronic devices among the transfer queue stored in the electronic device and the transfer queue stored in the first client electronic device, wherein the dividing of the plurality of client electronic devices among the transfer queue and the server transfer queue is effected without involvement of another device that is separate from the electronic device and the server electronic device.

13. The method of claim 12, wherein each client electronic device of the plurality of client electronic devices is associated with a ranking, and wherein the first client electronic device is associated with the highest ranking.

14. The method of claim 13, wherein the ranking is based on the estimated amount of time needed to complete transmission of the object.

15. The method of claim 12, wherein the plurality of client electronic devices are divided among the transfer queue stored in the electronic device and the transfer queue stored in the first client electronic device in accordance with whether the electronic device or the first client electronic device is able to transmit the object most effectively.

16. The method of claim 12, further comprising deleting the first client electronic device from the transfer queue after the object is transmitted to the first client electronic device and before the transfer queue is transmitted to the first client electronic device.

17. The method of claim 12, wherein the electronic device comprises a single communication interface.

18. An electronic device, comprising:

a processor; and memory in electronic communication with the processor, the memory being programmed with instructions for:

receiving an object from a server electronic device;

receiving a transfer queue that is associated with the object from the server electronic device, the transfer queue comprising a plurality of electronic devices that have requested the object but have not received the object;

after the object and the transfer queue are received from the server electronic device, communicating with the server electronic device about dividing the plurality of client electronic devices among the transfer queue and a server transfer queue stored in the server electronic device for further distribution of the object, wherein the dividing of the plurality of client electronic devices among the transfer queue and the server transfer queue is effected without involvement of another device that is separate from the electronic device and the server electronic device; and transmitting the object to a first client electronic device of the plurality of electronic devices, wherein the first client electronic device is included in the transfer queue after the plurality of client electronic devices are divided among the transfer queue and the server transfer queue, and wherein the server electronic device begins transmitting the object to at least one client electronic device that is included in the server transfer queue after the plurality of client electronic devices are divided among the transfer queue and the server transfer queue.

19. The device of claim 18, wherein each client electronic device of the plurality of client electronic devices is associated with a ranking, and wherein the first client electronic device is associated with the highest ranking.

20. The device of claim 19, wherein the ranking is based on the estimated amount of time needed to complete transmission of the object.

21. The device of claim 18, wherein the plurality of client electronic devices are divided among the transfer queue and the server transfer queue in accordance with whether the electronic device or the server electronic device is able to transmit the object most effectively.

22. The device of claim 18, wherein the method further comprises transmitting the transfer queue to the first client electronic device.

23. The device of claim 22, wherein the method further comprises deleting the first client electronic device from the transfer queue after the object is transmitted to the first client electronic device and before the transfer queue is transmitted to the first client electronic device.

24. The device of claim 18, wherein the method further comprises:

searching the server electronic device for the object;

finding the object on the server electronic device; and making a retrieval request for the object to the server electronic device.

25. The device of claim 18, wherein the method further comprises:

receiving a retrieval request for the object from a second client electronic device;

adding the second client electronic device to the transfer queue; and transmitting the object to the second client electronic device.

26. The device of claim 25, wherein the second client electronic device is ranked ahead of the first client electronic device in the transfer queue, and wherein the method further comprises:

suspending transmission of the object to the first client electronic device; and resuming transmission of the object to the first client electronic device after the object has been transmitted to the second client electronic device.

27. The device of claim 18, wherein transmitting the object to the first client electronic device comprises completing transmission of the object to the first client electronic device.

28. The device of claim 18, further comprising a single communication interface.

29. An electronic device, comprising:

a processor; and memory in electronic communication with the processor, the memory being programmed with instructions for:

associating an object with a transfer queue;

receiving retrieval requests for the object from a plurality of client electronic devices;

adding the plurality of client electronic devices to the transfer queue;

transmitting the object and the transfer queue to a first client electronic device of the plurality of client electronic devices; and after the object is transmitted to the first client electronic device, communicating with the first client electronic device about dividing the plurality of client electronic devices among the transfer queue stored in the electronic device and the transfer queue stored in the first client electronic device, wherein the dividing of the plurality of client electronic devices among the transfer queue and the server transfer queue is effected without involvement of another device that is separate from the electronic device and the server electronic device.

30. The device of claim 29, wherein each client electronic device of the plurality of client electronic devices is associated with a ranking, and wherein the first client electronic device is associated with the highest ranking.

31. The device of claim 30, wherein the ranking is based on the estimated amount of time needed to complete transmission of the object.

32. The device of claim 29, wherein the plurality of client electronic devices are divided among the transfer queue stored in the electronic device and the transfer queue stored in the first client electronic device in accordance with whether the electronic device or the first client electronic device is able to transmit the object most effectively.

33. The device of claim 29, wherein the method further comprises deleting the first client electronic device from the transfer queue after the object is transmitted to the first client electronic device and before the transfer queue is transmitted to the first client electronic device.

34. The device of claim 29, further comprising a single communication interface.

* * * * *